United States Patent [19]
Calcagno et al.

[11] 3,760,066
[45] Sept. 18, 1973

[54] PROCESS FOR PREPARING ALUMINUM TRICHLORIDE

[75] Inventors: Benedetto Calcagno; Luigi Piccolo, both of Milan; Marcello Ghirga, Bresso, all of Italy

[73] Assignee: Societa Italiana Resine S.p.A., Milan, Italy

[22] Filed: Mar. 31, 1972

[21] Appl. No.: 240,269

Related U.S. Application Data
[63] Continuation of Ser. No. 43,175, June 3, 1970, abandoned.

[30] Foreign Application Priority Data
June 13, 1969 Italy .............................. 18123 A/69

[52] U.S. Cl. ................ 423/496, 423/136, 423/635, 423/629
[51] Int. Cl. ............................ C01f 7/60, C01f 7/44
[58] Field of Search ................... 423/495, 496, 629, 423/136, 137; 23/142

[56] References Cited
UNITED STATES PATENTS

| | | | |
|---|---|---|---|
| 1,862,298 | 6/1932 | Carl | 423/136 |
| 2,048,987 | 7/1936 | Atherholt | 423/136 |
| 2,446,221 | 8/1948 | Ferguson | 423/135 X |
| 2,750,258 | 6/1956 | Jukkola et al. | 423/625 |
| 2,799,558 | 7/1957 | Smith et al. | 423/625 |
| 2,876,068 | 3/1959 | Tertian et al. | 423/628 |
| 2,915,365 | 12/1959 | Saussol | 423/628 |
| 2,916,356 | 12/1959 | Keith et al. | 423/628 |
| 2,961,296 | 11/1960 | Fenerty | 423/264 |

FOREIGN PATENTS OR APPLICATIONS

| | | | |
|---|---|---|---|
| 1,141,359 | 1/1969 | Great Britain | 23/95 |

Primary Examiner—Edward Stern
Attorney—Sughrue, Rothwell et al.

[57] ABSTRACT

Aluminium chloride is prepared by the action of chlorine and carbon on alumina previously heated for 1 to 2 hours at 700° to 1,000° C with improvement in chlorine yield and the maintenance of an exothermic reaction.

6 Claims, No Drawings

PROCESS FOR PREPARING ALUMINUM TRICHLORIDE

This is a continuation of application Ser. No. 43,175, filed June 3, 1970, now abandoned.

The present invention relates to a method of preparing aluminium trichloride, based essentially on the chlorination of aluminium in metallic form or of aluminium compounds and more particularly oxides.

Thus, for example, in the case of the chlorination of aluminium as such, chlorine gas is brought into contact with the metal molten at temperatures of the order of 900° C.; alternatively, lower temperatures may be used, the chlorine being fed to aluminium in granular form.

The main disadvantage of these methods is that they consume metallic aluminium, which is a somewhat costly raw material.

In other known processes, aluminium trichloride is prepared by the chlorination of alumina in the presence of a reducing agent consisting of carbon.

In these processes, the chlorine gas is fed over alumina/carbon agglomerates placed in rotary ovens or maintained in the form of a stationary bed in a reaction vessel.

This procedure has various drawbacks, mainly due to the difficulty of ensuring proper distribution of the gaseous reagent, on account of which the heat of reaction is frequently found to be irregularly distributed.

Moreover, the agglomerates tend to break up and thus to give rise to the formation of powder, with consequent obstruction.

Calcined bauxite is also used sometimes in the preparation of aluminium trichloride, by chlorination in the presence of carbon.

When bauxite is chlorinated, however, the resultant reaction products are contaminated with impurities, the elimination of which is not only technically difficult, but also expensive.

On the other hand, when chlorination in the presence of carbon is applied to commercial aluminas (which are normally used for the preparation of metallic aluminium), technically desirable speeds of reaction are achieved over a range of temperature (1,050° C. to 1,100° C.) at which carbon monoxide is mainly produced as a reaction by-product.

In other words, the reaction takes place essentially in accordance with the equation:

$$Al_2O_3 + 3Cl_2 + 3C \rightarrow 2AlCl_3 + 3CO \quad (1)$$

This is an endothermic reaction (approx. 8.5 kcal. per mole of gaseous aluminium trichloride), so that the application of heat from outside is necessary.

This fact is attended by various consequences.

First and foremost, carbon is consumed at a rate governed by the fact that part of it has to be oxidised (by the introduction of oxygen or air, for example), so as to maintain the ambient temperature of reaction at the desired level.

The fact of there also being a large amount of inert gas in the reaction atmosphere brings further disadvantages.

Thus, for example, should it be intended to operate in fluidised conditions, the amount of chlorine that can be introduced is limited by the presence of these inert gases.

In other words, the yield is reduced or larger reaction vessels must be used to maintain the same yield.

All these difficulties could be eliminated if it were possible to carry out the reaction of alumina chlorination in the presence of carbon within a temperature range lower than that already mentioned, such a reaction being represented by the following equation:

$$Al_2O_3 + 3Cl_2 + 1.5C \rightarrow 2AlCl_3 + 1.5CO_2 \quad (2)$$

This reaction is of an exothermic nature, some 22.5 kcal. being evolved per mol of gaseous aluminium trichloride.

Despite the lower temperature, the speed of reaction must, of course, be high enough to enable the process to be used commercially.

It has now been discovered that it is possible to obtain aluminium trichloride at high reaction speed, substantially in accordance with equation (2), provided the chlorination in the presence of carbon be applied to an alumina obtained by heat treatment of aluminium hydroxide within a well defined temperature range.

In more precise terms, the aluminium hydroxide — the substance obtained, for example, from processes in which bauxite is treated with caustic soda — is subjected to heat treatment for periods of from 1 hour to 2 hours, at temperatures of between 700° C. and 1,000° C.

It is undesirable to prolong treatment beyond two hours, because the aluminas so produced are difficult to chlorinate, while heat treatment applied for less than 1 hour is incomplete.

Working within the recommended temperature range, one obtains an alumina suitable for conversion into aluminium trichloride in the presence of carbon, with a chlorination temperature below 1,000° C., in accordance with equation (2), that is to say in more advantageous reaction conditions.

It should be observed that the heat treatment of the aluminium hydroxide can be carried out at temperature levels below those already mentioned, down to about 450° C. This has its drawbacks, however, since the resultant product is very sensitive to moisture and hence not easy to use.

The best results will be obtained from the method here proposed by the adoption of a fluidized-bed chlorination technique.

In more precise terms, the chlorine gas is fed into a fluidised bed consisting of alumina prepared in the manner already described and carbon, preferably coke, in the form of solid particles having a diameter of between 0.03 mm. and 0.8 mm.

For this reaction, the alumina and coke are used in the form of separate particles, that is to say not in the form of agglomerates as in the present state of the art, the alumina/coke weight ratio being between 3:1 and 4:1 and the reaction temperature below 1,000° C.

If commercially acceptable speeds of reaction are to be achieved, however, it is not advisable to work at temperatures lower than 800° C., the time in contact with the chlorine being from 5 to 20 seconds.

When the recommended temperature range is observed, this method offers the advantage, by comparison with the methods used hitherto, of less wear and tear on the reaction vessels used for preparing the aluminium trichloride.

In fact, with working temperatures of the order of 1,050° C. to 1,100° C., the life of the front-rank refractories is limited to a few months, whereas, when the working temperatures lie between 900° C. and 950° C., their life is extended to about 2 years.

Moreover, the fluidised-bed technique provides the best conditions as regards contact between gas and solids and the distribution of heat.

The procedures described above yield all these advantages by reason of the reaction conditions being exothermic, in addition to which a very high percentage of carbon dioxide is formed as a reaction by-product.

EXAMPLE 1

Dried aluminium hydroxide ($Al_2O_3$ content 65%), of the type obtained by decomposing bauxite with caustic soda, followed by hydrolysis, was subjected to heat treatment.

This treatment was applied to the granulated product for 2 hours at 700° C.

The result was a granular product having the following characteristics:
Particle size distribution: 0.6% of 0.35 mm.; 1.6% of 0.25 mm.; 46% of 0.125 mm.; 8.4% of 0.105 mm.; 39% of 0.062 mm.; and 4.4% of <0.062 mm. Purity: approx. 99.5%. Density heaped: 0.95 kg./cu.dm.

EXAMPLE 2

Aluminium hydroxide of the type described in Example 1 was subjected to heat treatment for 1½ hours at 900° C.

This yielded a final granular product having the following characteristics:
Particle size distribution: substantially the same as in Example 1. Purity: approx. 99.5% Density heaped: 0.98 kg./cu.dm.

EXAMPLE 3 (comparative)

Aluminium hydroxide of the type described in Example 1 was subjected to heat treatment for 1 hour at 1,300° C.

This yielded a final granular product having the following characteristics:
Particle size distribution: 0.5% of 0.35 mm.; 1.1% of 0.25 mm.; 50.5% of 0.125 mm.; 11.9% of 0.105 mm.; 32% of 0.062 mm.; and 4% of <0.062 mm.
Purity: approx. 99.5%.
Density heaped: 0.97 kg./cu.dm.

EXAMPLE 4 (Comparative)

In this example and in those which follow, the equipment used consisted of a vertical cylindrical reaction vessel measuring 5.5 cm. in diameter and 120 cm. in height. This was made of siliceous material and was fitted with a bottom plate of porous ceramic material for distributing the chlorine gas.

In addition, the equipment included an electrical system for the application of external heat.

The reaction products arising at the top of the reaction vessel were passed through a powder chamber for separation of the powder entrained and then were fed into a column cooled externally by air.

The aluminium trichloride solidified in the column, being thus separated from incondensable products.

Alumina prepared as described in Example (3) was used for this experiment, together with petroleum coke.

The coke was of 98.5% purity and its particle size distribution was: 1.2% of 0.25 mm.; 76.8% of 0.125 mm.; 12.2% of 0.105 mm.; 7.8% of 0.062 mm.; and 2% of <0.062 mm.

Of a mixture of alumina and petroleum coke (weight ratio 7:3), 1,200 g. was placed in the reaction vessel, into which chlorine gas was fed at rates of 70 to 230 N. litres/hour.

Table 1 shows the other experimental conditions and the results obtained from the various experiments.

Throughout the experiment, the level of the fluidised bed was maintained constant by the use of an automatic system for feeding the alumina/coke mixture.

The aluminium chloride produced in these experiments was in the form of fine, uniform powder, light yellow in colour. Its bulk density was 1.1 kg./cu.dm. and 99% to 99.5% of its consisted of aluminium trichloride capable of sublimation, the remainder consisting of entrained powder (aluminium and coke) and hydrolysis products.

TABLE 1

| Experiment number | Chlorination temperature (°C.) | Chlorine reaction time (sec.) | Chlorine yield (%) | Volumetric ratio ($CO_2/CO + CO_2$) in exit gases |
|---|---|---|---|---|
| 1 | 950 | 10 | 44 | 0.36 |
| 2 | 950 | 15 | 65 | 0.31 |
| 3 | 950 | 20 | 76 | 0.27 |
| 4 | 1,050 | 7.5 | 90 | 0.35 |
| 5 | 1,050 | 10 | 98 | 0.23 |
| 6 | 1,050 | 12.5 | 100 | 0.20 |

EXAMPLE 5 (Comparative)

The alumina used in this experiment was that marketed by Societa SAVA as "X 300."

This has the following characteristics:
Particle size distribution: 0.5% of 0.35 mm.; 1.4% of 0.25 mm.; 38.2% of 0.125 mm.; 13.2% of 0.105 mm.; 37.5% of 0.062 mm.; and 9.2% of <0.062 mm. Purity: approx. 99.5%.

The same procedure was followed as in Example (4), the results being shown in Table 2. The aluminium trichloride produced had the same characteristics as in Example 4.

TABLE 2

| Experiment number | Chlorination temperature (°C.) | Chlorine reaction time (sec.) | Chlorine yield (%) | Volumetric ratio ($CO_2/CO + CO_2$) in exit gases |
|---|---|---|---|---|
| 1 | 950 | 10 | 41 | 0.32 |
| 2 | 950 | 15 | 65 | 0.31 |
| 3 | 950 | 20 | 79 | 0.25 |
| 4 | 1,050 | 7.5 | 87 | 0.36 |
| 5 | 1,050 | 10 | 98 | 0.20 |
| 6 | 1,050 | 12.5 | 100 | 0.21 |

EXAMPLE 6

The alumina used in this experiment was that produced as described in Example (2).

The same procedure was followed as in Example (4) and the aluminium trichloride produced had the same characteristics as described in that example.

The results are summarised in Table 3.

TABLE 3

| Experiment | Chlorination temperature | Chlorine reaction time | Chlorine yield | Volumetric ratio ($CO_2/C + CO_2$) |

| Experiment number | chlorination temperature (°C.) | Chlorine reaction time (sec.) | Chlorine yield (%) | Volumetric ratio (CO₂/CO + CO₂) in exit gases |
|---|---|---|---|---|
| 1 | 900 | 5 | 95 | 0.87 |
| 2 | 900 | 7.5 | 96.5 | 0.85 |
| 3 | 900 | 10 | 100 | 0.85 |
| 4 | 950 | 5 | 100 | 0.75 |
| 5 | 950 | 7.5 | 100 | 0.72 |
| 6 | 950 | 10 | 100 | 0.70 |

EXAMPLE 7

The alumina used in this experiment was that produced as in Example (1).

The same procedure was followed as in Example (4) and the aluminium trichloride produced had the same characteristics as described in that example.

The results are summarised in Table 4.

TABLE 4

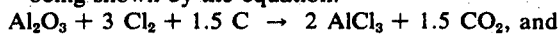

| Experiment number | chlorination temperature (°C.) | Chlorine reaction time (sec.) | Chlorine yield (%) | Volumetric ratio (CO₂/CO + CO₂) in exit gases |
|---|---|---|---|---|
| 1 | 900 | 5 | 97 | 1.0 |
| 2 | 900 | 7.5 | 100 | 0.95 |
| 3 | 900 | 10 | 100 | 0.95 |
| 4 | 950 | 5 | 100 | 0.91 |
| 5 | 950 | 7.5 | 100 | 0.91 |
| 6 | 950 | 10 | 100 | 0.87 |

We claim:

1. A method of preparing aluminium trichloride at a high reaction speed and with reduced wear and tear of the reaction vessel which comprises:

a. treating bauxite with caustic soda and hydrolyzing the reaction product to produce aluminum hydroxide particles;

b. heating said aluminum hydroxide particles for a period of from 1 to 2 hours and at a temperature of from 700° to 1,000° C to produce alumina particles;

c. reacting said alumina particles exothermically with chlorine gas in a fluidized bed, said fluidized bed consisting essentially of said alumina and carbon as separate particles and being contained in a reactor made of siliceous material, at a maintained temperature of from 800° C to 1,000° C, said reaction being shown by the equation:

$Al_2O_3 + 3\ Cl_2 + 1.5\ C \rightarrow 2\ AlCl_3 + 1.5\ CO_2$, and wherein the amount of chlorine is at least the stoichiometric amount required to convert the $Al_2O_3$ into $AlCl_3$; and d. recovering the $AlCl_3$.

2. A method as claimed in claim 1, employing alumina:carbon weight ratios of from 3:1 to 4:1.

3. A method as claimed in claim 1, in which the alumina and carbon as used in the form of particles having a diameter of 0.3 mm. to 0.8 mm.

4. A method as claimed in claim 1, in which the contact times in relation to the chlorine lie between 5 and 20 seconds.

5. The method of claim 1, wherein said carbon is coke.

6. The method of claim 1, where said formation of aluminum trichloride is at a working temperature of 900° to 950° C.

* * * * *